Oct. 5, 1971          J. M. KRAFFT          3,610,033
              SKEWABLE 3-D CONSIDÈRE COMPUTER
Filed May 5, 1970                        2 Sheets-Sheet 1

INVENTOR
JOSEPH M. KRAFFT

BY *(signature)* AGENT
*(signature)* ATTORNEY

United States Patent Office 3,610,033
Patented Oct. 5, 1971

---

3,610,033
SKEWABLE 3-D CONSIDÉRE COMPUTER
Joseph M. Krafft, 1709 Oakcrest Drive,
Alexandria, Va. 22302
Filed May 5, 1970, Ser. No. 34,660
Int. Cl. G01n 21/00
U.S. Cl. 73—88 A                    8 Claims

ABSTRACT OF THE DISCLOSURE

This invention makes use of an optical shadowing device for tangential scanning of a skewable, three-dimensional empirical surface of true stress vs. strain vs. strain rate data curves to determine instability conditions of a material brought about by working of the metal.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Heretofore, conditions of instability in a material have been evaluated from a two-dimensional stress-strain curve by simple graphical or numerical techniques. These evaluations are limited and do not permit consideration of variables such as temperature or strain rate. An old method due to Considére comprises establishing a two-dimensional true-stress vs. true-strain curve from mechanical test. Such as has been reported in a book Theory of Flow and Fracture of Solids, by A. Nadai, McGraw-Hill 1950 (p. 70). Usually either tensile or compressive straining will be employed and suitable geometric correction for the contraction or expansion of area and length are applied to estimate "true" stress, $\bar{\sigma}$, and strain, $\bar{\epsilon}$. The condition of instability is given as $d\bar{\sigma}/d\bar{\epsilon} = C\bar{\sigma}$ where C is a factor between ½ and 2 depending on the state of stress or the degree of constraint. For cases of uniaxial tension and also of moderate biaxiality, the value of C is unity. Usually $\bar{\sigma}$, and thus its derivative, is simply a function of true strain, $\bar{\epsilon}$. Thus, the tangent to the "true" strain vs. "true" stress curve, drawn from a distance equal to unit strain back on the zero stress axis, has the slope $d\bar{\sigma}/d\bar{\epsilon}$ as tangent, and also the slope $\bar{\sigma}$ as altitude of the unity base triangle as shown in FIG. 1. However, if the stress $\bar{\sigma}$ is a function of another variable, such as strain rate, one must modify the shape of the stress-strain curve to allow for the variation in strain rate in order to apply the criterion. This is a tedious and cumbersome task, and the overall view of the effects tends to become obscured by the arithmetic involved.

SUMMARY OF THE INVENTION

Recent research on the fracture toughness of mild steel for pressure vessel construction has been reported and published in The American Society of Mechanical Engineerings, paper #69–WA/PVP–8, entitled "Fracture-Flow Relationships for A533B Pressure Vessel Steel" by J. M. Krafft, L. R. Hettche, A. M. Sullivan and F. J. Loss. Data obtained from isothermal compression test revealed a strong, harmonic, strain rate dependence in the flow stress of a pressure vessel steel. Such behavior is shown by the composite 3-D Considére computer of this invention. The computer is made of a plurality of templates each cut to the profile of the average true stress $\bar{\sigma}$ vs. true stress $\bar{\epsilon}$ curve shape. The templates are positioned side-by-side and their relative heights are determined by a base formed of a profile pattern corresponding to the strain rate. The templates are made of a flexible material so that one end may be skewed for taking a time exposure picture. The shadow pattern from the photograph is then a direct representation of the border of instability. The acute peaks and troughs resulting from the exposed flanks and shadowed valleys of the skewed ridges have direct correspondence to the plane strain fracture toughness, $K_{IC}$.

STATEMENT OF THE OBJECTS

It is therefore an object of the present invention to provide a system for determining instabilities in a material for either tensile or compressive straining.

Another object is to provide a system for determining instabilities in a material without the use of tedious numerical computational methods.

Still another object is to determine instabilities in a material by use of a simple system operable by skilled as well as by unskilled personnel.

Yet another object is to provide a method for simulating the modification to the shape of the stress-strain curve, and thus of the tensile instability strain due to changes in strain rate inherent in the condition of deformation.

Other and more specific objects of the invention will become apparent upon a careful consideration of the detailed description when considered with the drawing.

DESCRIPTION OF THE INVENTION

Figure 3:
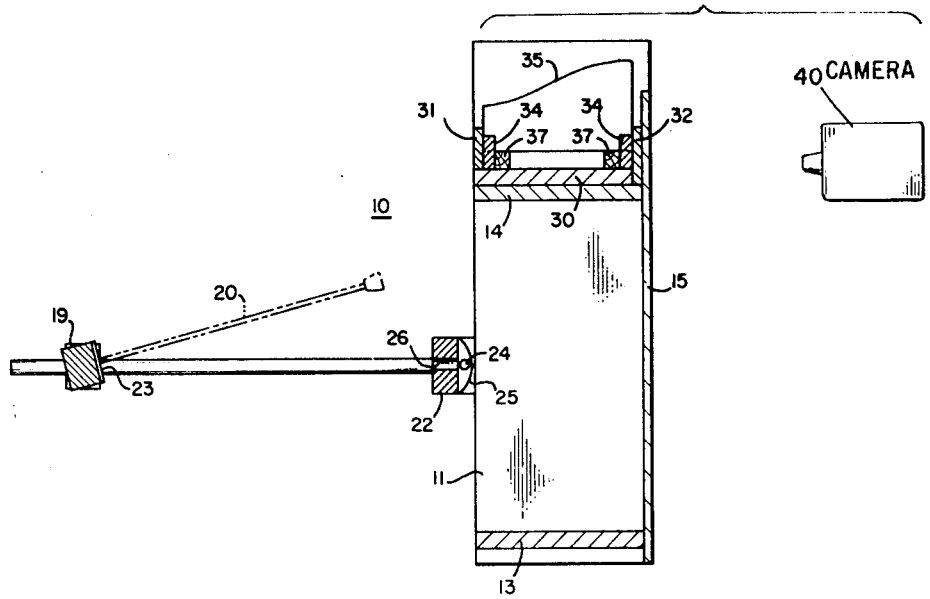
FIG. 3 illustrates a cross sectional view of the computer to illustrate its relative parts.

Now referring to the drawings, there is shown for illustrative purposes a device made in accordance with the teaching of this invention. As shown, the device includes a frame 10 having end plates 11 and 12 separated by a bottom plate 13 and an upper plate or shelf 14 which is located between the mid-point of the end plates and the upper end thereof. Bottom plate 13 and the upper plate 14 are parallel with each other and perpendicular to the end plates. The frame has a backing panel 15 which serves to stiffen and interconnect the frame.

The front face of each end plate is provided with a plurality of equally spaced holes 16 drilled normal thereto on the same horizontal plane through each end plate. Corresponding holes receive therein the ends of spaced parallel rods 17. A pin 18 slips through a hole 21 in the outer side of the end plate into a hole in the rods to hold each of the rods in place perpendicular to the end plates. A light bar 22 that produces a thin, wide sheet of parallel light is secured between the rods adjacent to the front face of the end plates. An elongated plane mirror 23 is positioned between the rods near the outer end thereof to reflect the sheet of parallel light back toward the upper plate of the frame. The mirror means is secured in rod mounts for pivoting about the axis to reflect the light on an arc as the mirror is rotated about its axis. The light beam may be made by a plurality of linearly aligned incandescent lamps 24 each with parabolic reflectors 24 that project a thin sheet of parallel light onto the plane mirror through slot 26.

Figure 1:
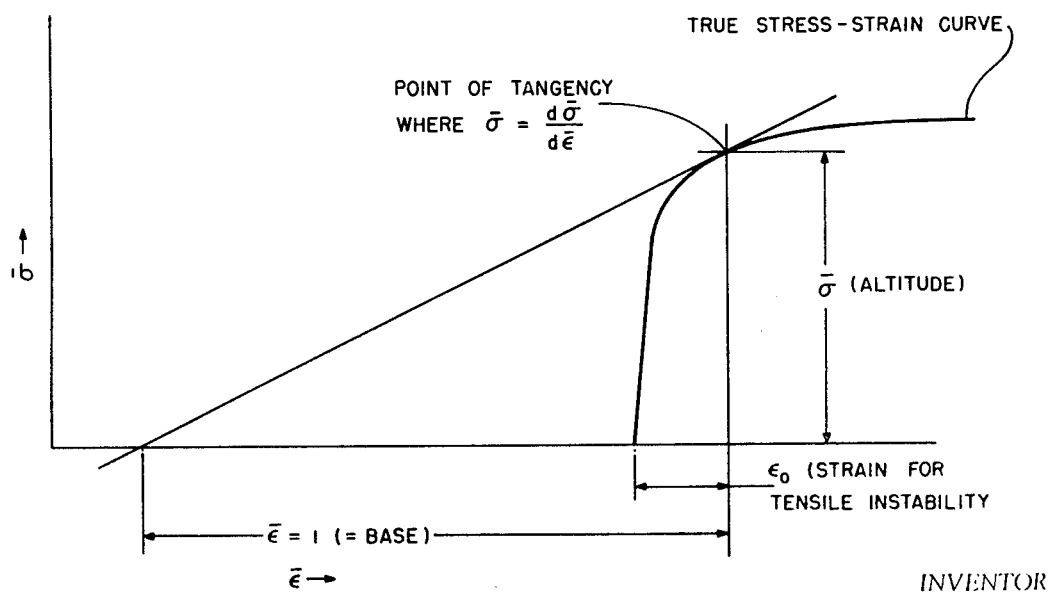
FIG. 1 illustrates a true-stress vs. strain curve with a tangent to the line drawn from a distance equal to unit strain back on the zero stress axis.

The rods are placed on the zero stress axis with the mirror placed a scaled distance equal to a strain of $\bar{\epsilon}=1$. Thus, the light will be located at the point at which the tangent to the stress $\bar{\sigma}$ vs. strain $\bar{\epsilon}$ curve crosses the stress line as shown in FIG. 1. The front end of the end plates are provided with additional holes 16, these holes are spaced such that the rods may be moved to other holes. When the rods are moved to other holes, there will be a representation of more or less stress depending on whether the rod is moved down or up. Moving the rod down from the zero stress axis represents a greater flow strength of the test material as represented by the stress-strain curve of the template set forth below. Moving the rod above the zero axis represents a lesser flow strength of the material.

The upper plate supports a template holder which comprises parallel front and back sides 31 and 32 each of which have vertical slots 34 therein and are separated by side plates 33 which are hinged at each end by hinges 36. A stack of separate templates 35 each cut to the profile of the average true-stress $\bar{\sigma}$ vs. true-strain $\bar{\epsilon}$ curve shape are secured within the slots. The template support is shown assembled onto a bottom plate, however, the bottom plate could be omitted and the structure positioned directly on the plate 14 of the frame. The front side is secured against movement whereas the back side is movable parallel with the front side because of the hinged end plates. The templates form a three dimensional model of the stress strain rate of a test material. The end of each of the templates are slid into the slots within the front and back sides so that they stand upright. The variable heights of each of the side-by-side templates are controlled by a profile pattern 37 placed on the support adjacent the front and back bars and the array may be skewed by movement of the back bar. The profile pattern represents a curve of the flow stress variations with strain rate of a test material. The flow stress variations are obtained by sequentially straining the test material at different strain speeds and plotting the strain values. Such a curve may be obtained by use of a device set forth in Pat. No. 3,397,572 by changing the orifice setting of the patented device to obtain different straining speeds.

Figure 2:
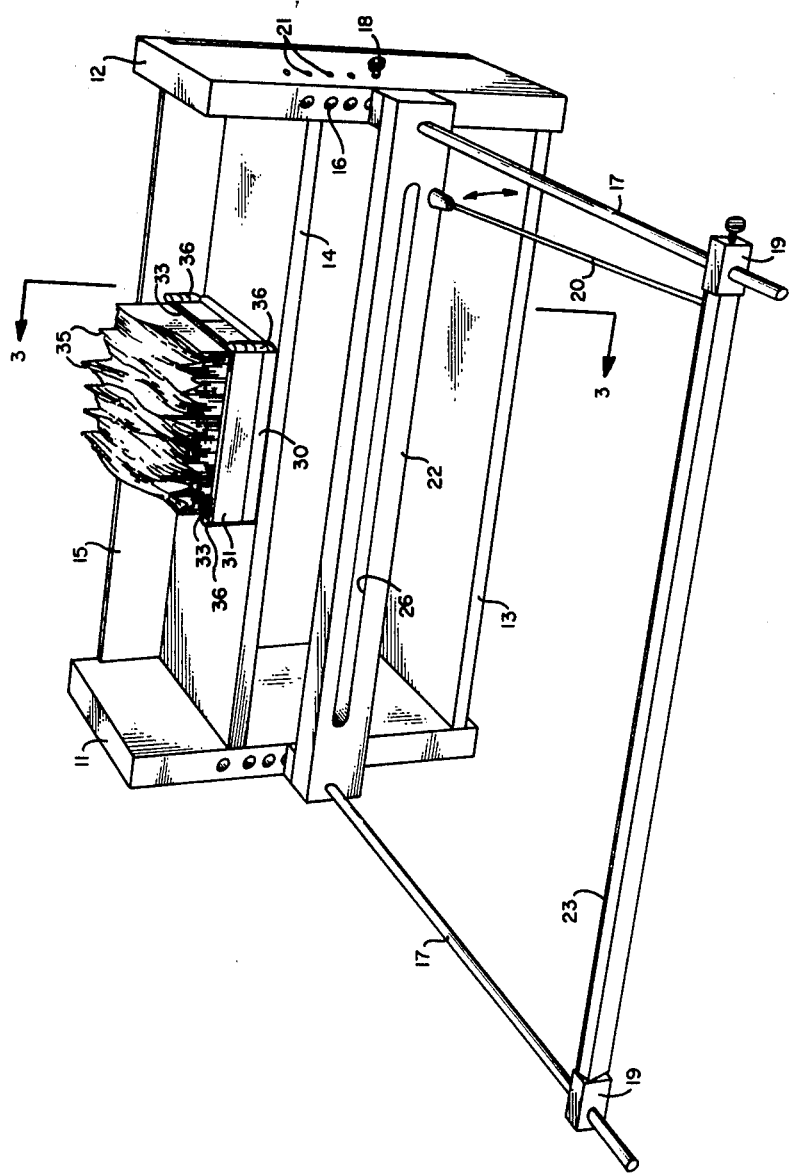
FIG. 2 illustrates a front view of the Considére computer.

A three dimensional model of the stress-strain rate may be formed by a stack of cardboard, metal or plastic templates each cut to the profile of the average true-stress $\bar{\sigma}$ vs. true-strain $\bar{\epsilon}$ curve shape. The stack of templates may be placed in a separate box-like container having hinged end plates which permits skewing while holding the templates perpendicular to the base with the container placed onto the upper plate of the frame. Such an arrangement is shown in FIG. 2 of the previously mentioned article.

The templates that form a three-dimensional model of the stress-strain rate of a test material are stacked between the front and back bars in accordance with the profile pattern of the test material. The light source is lit to shine a thin light beam having a width substantially the length of the frame onto the mirrored surface. The back bar is forced in one direction to its extreme position laterally along the upper plate in a line parallel with the back plate while maintaining the stacked templates perpendicular to the plate. Thus, the templates will be skewed. The light is reflected back over the template stacked model and the mirror position is rocked on its axis to "paint" the model with a sheet of shadowing parallel light. While the model is "painted" with the light, the room is darkened so that the shadow pattern may be photographed by a suitable long focal length camera 40. The camera is positioned to view the model normal to the top of the model and the upper plate of the frame upon which the model rests. A timed exposure of about two minutes is typical. The shadow pattern in the photograph is a direct representation of the border of instability. The bright areas represent regions of plastic flow stability and the shadow regions represent instability. The strain troughs occur on the low or shadow side of the flow stress ridges while peaks result from the deep illumination of their exposed flanks. These peaks and troughs have a direct correspondance to the plane strain fracture toughness $K_{IC}\alpha$ in its sensitive variation with respect to loading rate of the crack, $dK/dt$.

As pointed out above, the rods may be moved up or down thereby changing the angle of the light beam relative to the templates model. The outer end of the rod may include linearly spaced notches therein for the purpose of moving the mirror away from or nearer to the light source.

The light source has been shown located on the frame, however, it will be obvious to one skilled in the art that the light source may be placed at any other position to shine onto the mirror and be reflected onto the model. Such light positioning may be above or below the device. With the use of a closed housing having an elongated slit the length of the width of the frame, the light could shine directly onto the model without the use of a mirror. In such an arrangement the slit would have to be on the zero stress line at the proper location for "painting" the light over the stress-strain model.

When the model is formed with suitable templates in accordance with the profile pattern of stress-strain curves and placed onto the frame, the distance along the upper plate over the length along the model represents flow stress variations with strain rate. The value represented on the horizontal is stress and the upward represented value is strain. Therefore, the template model represents the various test factors. The models may be made with a few templates or a great many wherein the greater number of templates represents the greater range of strain rate variation as possible with the patented device previously mentioned.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. In a device for determining instability conditions of a material; which comprises,
   a plurality of flexible templates adapted to be positioned side-by-side parallel to each other and perpendicular to a base, means for securing the templates on said base at a height relative to each other to form a profile pattern corresponding to the flow stress sensitivity to strain rate of the material tested to form a three dimensional model,
   each of said templates having its upper surface cut to the profile of the average true stress vs. true strain curve of the material tested.

2. In a device for determining instability conditions of a material as claimed in claim 1; which comprises,
   a form for securing said templates in parallelism in a side-by-side arrangement,
   said form including parallel front and back plates and end plates for holding said front and back plates in place with said back plate movable along a line in parallelism with said front plate and in the same plane.

3. In a device as claimed in claim 2; wherein, said end plates are hinged to said back plate to permit movement of said back plate relative to said front plate.

4. In a device as claimed in claim 2; wherein, said end plates are of a flexible material to permit skewing of said templates.

5. In a device as claimed in claim 2; which includes, a profile bar adjacent said front and back plate formed of a profile pattern corresponding to the flow stress sensitivity to strain rate of the test material to position said templates in their relative heights.

6. In a device as claimed in claim 2; which includes,
   a frame for securing said template form holding means,
   a light means secured relative to said frame,
   a mirror means secured relative to said light means and said frame for reflecting light onto said side-by-side templates tangent to the profile surface.

7. In a device as claimed in claim 6; wherein, said light means is of a light source providing a sheet of parallel light with its axis of parallelism perpendicular to the wide axis of the frame.

8. In a device as claimed in claim 6; which includes,
a camera means,
said camera means positioned relative to said template model to photograph the shadow pattern of said template model.

References Cited
UNITED STATES PATENTS 3,134,839   5/1964   Girotti _____ 73—156

JERRY W. MYRACLE, Primary Examiner